Jan. 7, 1964 G. L. CLAPPER 3,117,240

TRANSISTOR INVERTER AMPLIFIER EMPLOYING CAPACITOR DIODE COMBINATION TO PROVIDE SYNCHRONOUS OUTPUT FROM SYNCHRONOUSLY APPLIED INPUT

Filed Oct. 27, 1960 2 Sheets-Sheet 1

INVENTOR
GENUNG L. CLAPPER

BY G. R. Gugger
AGENT

Jan. 7, 1964 G. L. CLAPPER 3,117,240

TRANSISTOR INVERTER AMPLIFIER EMPLOYING CAPACITOR DIODE COMBINATION TO PROVIDE SYNCHRONOUS OUTPUT FROM SYNCHRONOUSLY APPLIED INPUT

Filed Oct. 27, 1960 2 Sheets-Sheet 2

3,117,240

TRANSISTOR INVERTER AMPLIFIER EMPLOYING CAPACITOR DIODE COMBINATION TO PROVIDE SYNCHRONOUS OUTPUT FROM SYNCHRONOUSLY APPLIED INPUT

Genung L. Clapper, Vestal, N.Y., assignor to International Business Machines Corporation, New York, N.Y., a corporation of New York Filed Oct. 27, 1960, Ser. No. 65,497
6 Claims. (Cl. 307—88.5)

The present invention relates to pulse generating circuits and more particularly to a transistor pulse generating circuit capable of providing the correct complement of a given train of discrete input pulses.

It is often required in computing devices, for instance of the type employed in binary digital applications, to provide complemented outputs in response to a signal input. In the past, it has been found that information bits that are discrete may not be satisfactorily inverted for complementing. A complement generator produces an output which is the complement of each input bit; that is, a "1" input will result in a "0" output and vice versa. However, mere inversion of the input wave form is sunsatisfactory because the 0's and 1's then occupy a disproportionate percentage of the bit interval. Also, the gaps between 1's become short 1's between 0's giving rise to spurious signals.

In accordance with the present invention, the above problems are solved by providing an inverting transistor amplifier which is gated by sync pulses. The input is applied through a diode to the base of the transistor amplifier. A capacitor is also connected to the base, the other side of the capacitor being connected to the source of sync pulses. When a 0 input is applied the capacitor is discharged by a positive going synch pulse. When the sync pulse returns the capacitor charging current turns on the transistor and produces a pulse at the output. This pulse is terminated by the next synch pulse. Thus, a "1" has been produced in the time interval for which the input received is 0.

When a 1 input is applied to the input, the capacitor is discharged by the positive edge of the sync pulse as before, but the capacitor charging current at the negative edge of the sync pulse flows from the input instead of turning on the transistor. The transistor remains cut off so that a "0" has been produced in the time interval for which the input is 1.

Looking at another circuit application, a stroke function generator produces an output which is equal to *A/B* where A and B are the inputs. This function is the complement of the "and" function and the same problems exist in inverting the output of an ordinary "and" gate as were discussed in conjunction with the complement generator above. Utilizing the principles of the present invention, a stroke function generator has two inputs applied through diode gating circuitry to the base of a transistor as in the complement generator. Also, capacitors are connected to each of the inputs and to a source of sync pulses. In a manner similar to the operation of the complement generator, the transistor in the stroke function generator produces an output which is the inverse of the input "and" gate but which is limited in time duration by the sync pulses.

Accordingly, a principal object of the present invention is to provide an improved complement generator for producing an output which is the correct complement of each input pulse.

A further object of the present invention is to provide a complement generator which inverts discrete input information pulses and which also maintains a proportionate relationship with the basic sync pulse time interval.

A still further object of the present invention is to provide an improved complement generator or stroke function generator which comprises an inverting transistor amplifier which is gated by sync pulses whereby an output is produced which is the inverse of the input and gate but which is limited in time duration by the sync pulses.

The foregoing and other objects, features and advantages of the invention will be apparent from the following more particular description of preferred embodiments of the invention, as illustrated in the accompanying drawings.

Figure 1:
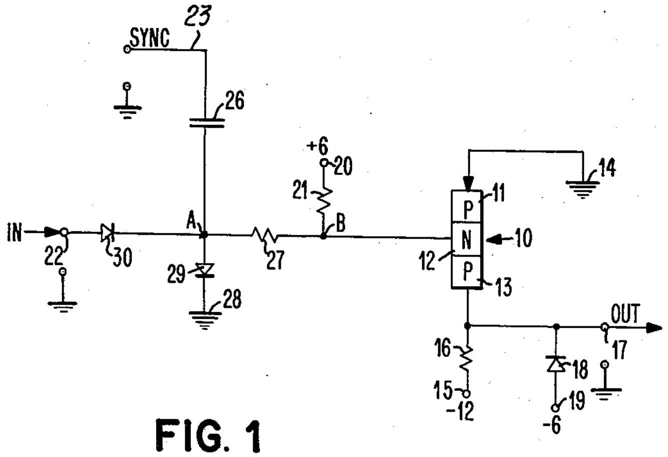
FIG. 1 is a schematic circuit diagram of a complement generator arranged in accordance with the principles of the present invention.

Referring to FIG. 1, the complement generator comprises an inverting transistor amplifier 10 having an emitter electrode 11, a base electrode 12 and a collector electrode 13. The emitter 11 is connected to a source of ground potential 14 and the collector electrode 13 is connected to a negative 12 volt terminal 15 by way of a resistor 16. An output terminal 17 is shown connected to the collector electrode and the output is clamped at a negative 6 volts by means of a clamping diode 18 connected between the output line and a negative 6 volt terminal 19.

Figure 2:
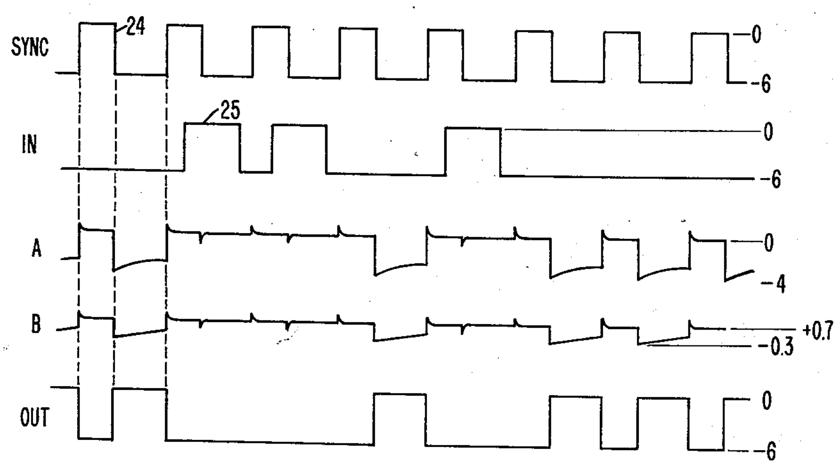
FIG. 2 is a diagram illustrating the wave forms at various points of the circuit shown in FIG. 1.

The transistor is normally biased in the non-conducting state by means of a positive 6 volt supply terminal 20 and biasing resistor 21 which are connected at point B to the base electrode 12. Also, connected to point B is a gated input circuit which is controlled from an input pulse terminal 22 and a suitable source of synchronizing pulses which is connected to a sync pulse line 23. There is preferably provided on line 23 a train of sync pulses 24, as shown in FIG. 2, and at the input terminal 22 there is provided the information pulses 25, also shown in FIG. 2. The sync line 23 is shown connected, by way of a capacitor 26 and junction point A, to the base elctrode of transistor 10 through a resistor 27 and also to a ground terminal 28 by way of a clamping diode 29 which serves to prevent point A from rising above ground potential. The input terminal 22 is shown connected to junction point A by way of an input diode 30 which acts as a secondary clamping diode.

In the operation of the circuit, with the input at terminal 22 at the negative 6 volt level to indicate a "zero," a sync pulse upswing from negative 6 volts to 0 volts will cause capacitor 26 to discharge through the diode 29 to ground and point A will be held at substantially 0 volts. When the sync pulse returns to the negative 6 volt level, point A will drop to approximately a negative 4 volts to switch transistor 10 on and current will flow through the emitter-base circuit and resistor 27 to charge the capacitor. Current will also flow in the collector circuit of the transistor to the negative 6 volt terminal 19 and an output pulse is produced at terminal 17. In the absence of output pulses, the terminal 17 is clamped at negative 6 volts by the diode 18. This output pulse will be terminated by the upswing of the next sync pulse which will raise the voltage at point A to 0 volts and effect turn-off of transistor 10. Thus, a "one" output has been produced in the time interval for which the input received a "zero."

When the input at terminal 22 goes to 0 volts to represent a "one," the capacitor will be charged through the input diode 30 as the sync line drops from 0 volts to negative 6 volts. Point A is at substantially 0 volts and it will not drop low enough to allow current to flow in the transistor base circuit and the transistor remains cut off. The result is that the output remains at negative 6 volts and thus, a "zero" is produced in the time interval for which the input received a "one." As illustrated in FIG. 2, as each pulse representing a "one" appears at the input, point A is clamped at 0 volts to effectively prevent the transistor from turning on to produce a "one" and if no pulse is present at the input, a pulse is produced at the output under control of the sync pulse, as described above.

Figure 3:
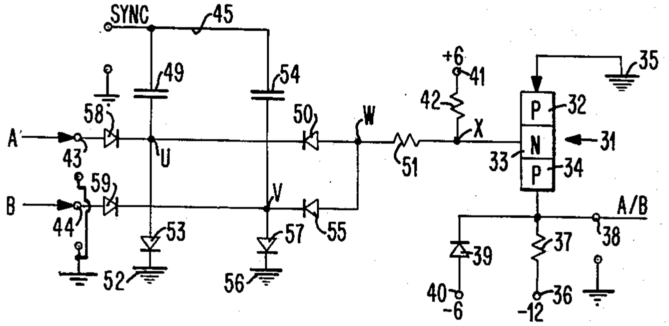
FIG. 3 is a schematic circuit diagram of a stroke function generator arranged in accordance with the principles of the present invention.

Referring now to FIG. 3, the principles of the present invention are shown embodied in a stroke function generator circuit which performs the logical function *A/B*. This is the equivalent of $(\overline{A}+\overline{B})$ or $\overline{(A \cdot B)}$ which are "NOT" or complement functions. The stroke function generator circuit is somewhat similar to the above described complement generator and comprises the inverting transistor amplifier 31 having an emitter electrode 32, a base electrode 33 and a collector electrode 34. The emitter 32 is connected to a source of ground potential 35 and the collector electrode 34 is connected to a negative 12 volt terminal 36 by way of a resistor 37. An output terminal 38 is shown connected to the collector electrode and the output is clamped at a negative 6 volts by means of a clamping diode 39 connected between the output line and a negative 6 volt terminal 40.

Figure 4:
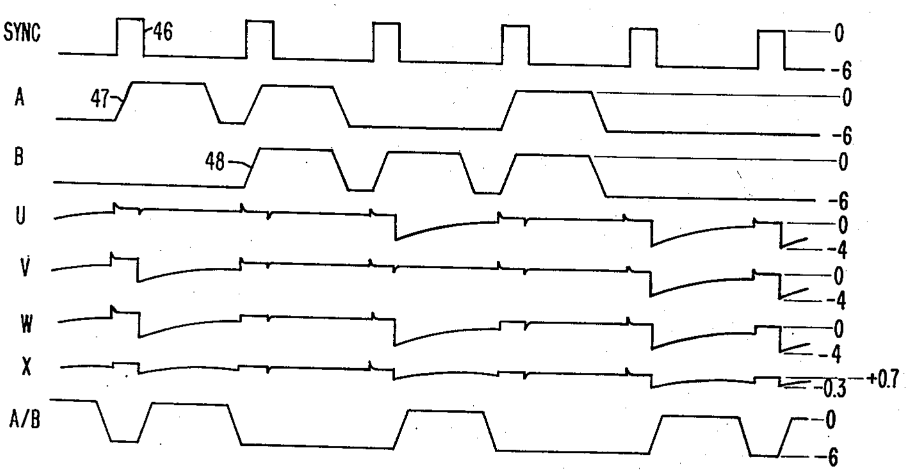
FIG. 4 is a diagram illustrating the wave forms at various points of the circuit shown in FIG. 3.

As in the case of the complement generator, the transistor 31 is normally biased in the non-conducting state by means of a positive 6 volt supply terminal 41 and biasing resistor 42 which are connected at point X to the base electrode 33. Also, connected to point X is a gated input circuit which is controlled from a pair of input pulse terminals 43 and 44 and a suitable source (not shown) of synchronizing pulses which is connected to a sync pulse line 45. There is preferably provided on line 45 a train of sync pulses 46, as shown in FIG. 4, and at the input terminals 43 and 44 there are provided the information pulses 47 and 48 respectively, also shown in FIG. 4. The sync line 45 is shown connected, by way of a capacitor 49 and junction point U, to the base electrode of transistor 31 through a diode 50 and a resistor 51 and also to a ground terminal 52 by way of a clamping diode 53 which serves to prevent point U from rising above ground potential. In similar fashion, sync line 45 is also connected, by way of a capacitor 54 and junction point V, and back to the base electrode of the transistor through a diode 55 and junction point W and also to a ground terminal 56 by way of the clamping diode 57. The input terminals 43 and 44 are shown connected to the junction points U and V by way of the input diodes 58 and 59 which act as secondary clamping diodes.

Before discussing the operation of the circuit a brief examination of the truth table is in order.

*Truth Table*

| A | B | A/B |
|---|---|---|
| 0 | 0 | 1 |
| 1 | 0 | 1 |
| 0 | 1 | 1 |
| 1 | 1 | 0 |

The above truth table for the stroke function reveals that the only combination to produce a zero output is the combination of two "ones." All other input combinations produce a "one" at the output.

In the operation of the circuit, if both the A and B inputs at terminals 43 and 44 are up to 0 volts, indicating "one" inputs, then the junction points U and V are prevented from dropping below 0 volts by the current that flows in the input diodes 58 and 59 to charge the capacitors 49, 54, as the sync line 45 drops to negative 6 volts. Thus, the transistor 31 will be biased in the cut-off condition and a zero output of negative 6 volts is produced at terminal 38. If either of the A or B inputs is at negative 6 volts, indicating a zero, then either the U or V junction point will be permitted to drop to approximately negative 4 volts at the end of sync pulse time. Current will now flow from the ground terminal 35, through the emitter-base circuit of the transistor, resistor 51, either diode 50 or 55, to junction point U or V to charge the capacitor. This current turns the transistor on and current flows in the collector circuit resulting in the output voltage at terminal 38 raising to 0 volts to indicate a "one" output. In similar fashion, a "one" output is produced for "zero" inputs at both the A and B input terminals 43 and 44. An output pulse from the stroke function generator will be terminated by the upswing of the next sync pulse which will raise the voltage at points U and V to 0 volts and effect turn-off of the transistor.

It should be noted that the stroke generator produces the correct positive representation of the truth table values of the stroke function from positive inputs. The complement function is produced internally. This then becomes the simplest way to produce the stroke function since only passive elements are used for the complement function and for the logic. The transistor which is the active element is used for reshaping and power gain.

While the invention has been particularly shown and described with reference to preferred embodiments thereof, it will be understood by those skilled in the art that various changes in form and details may be made therein without departing from the spirit and scope of the invention.

What is claimed is:

1. A pulse generating circuit comprising an inverting amplifier transistor having emitter, base and collector electrodes, a source of emitter potential, said transistor being normally biased off, a source of discrete input information pulses, an input diode connected between said input pulse source and the base electrode of said transistor, a source of sync pulses, a capacitor connected between said sync pulse source and the base electrode of said transistor, and a discharge circuit for said capacitor, said capacitor being charged through said input diode upon the appearance of an input pulse coupled with the termination of a sync pulse to maintain said transistor in its off state whereby no output is produced during the presence of said input pulse, said capacitor being discharged upon termination of said input pulse coupled with the appearance of another sync pulse, and then charged upon termination of said other sync pulse through the base-emitter circuit of said transistor to effect turn on of the transistor whereby an output is produced indicating the absence of an input pulse.

2. In a pulse generating circuit, the combination of an inverting amplifier transistor having emitter, base and collector electrodes, a source of emitter potential, said transistor being normally biased off, a source of discrete input information pulses, an input diode connected to said input pulse source, a source of sync pulses, a capacitor connected to said sync pulse source, a source of return voltage, a clamping diode connecting said capacitor and said return voltage source, and common circuit means connecting said input diode, capacitor and clamping diode with the base electrode of said transistor.

3. A pulse generating circuit comprising an inverting amplifier transistor having emitter, base and collector electrodes, a source of emitter potential, said transistor being normally biased off, a first source of discrete input information pulses, a first input diode circuit connected between said first input pulse source and the base electrode of said transistor, a second source of discrete input information pulses, a second input diode circuit connected between said second input pulse source and the base electrode of said transistor, a source of sync pulses, a first capacitor connected between said sync pulse source and said first diode circuit, a second capacitor connected between said sync pulse source and said second diode circuit, and a discharge circuit for each of said capacitors, said input diode circuits effectively charging said capacitors upon the presence of an input pulse from both said input pulse sources coupled with the termination of a sync pulse whereby said transistor is maintained off and no output is produced during the presence of both said input pulses.

4. A pulse generating circuit comprising an inverting amplifier transistor having emitter, base and collector electrodes, a source of emitter potential, said transistor being normally biased off, a first source of discrete input information pulses, a first gating circuit connected between said first input pulse source and the base electrode of said transistor, a second source of discrete input information pulses, a second gating circuit connected between said second input pulse source and the base electrode of said transistor, a source of sync pulses, a first capacitor connected between said sync pulse source and said first gating circuit, a second capacitor connected between said sync pulse source and said second gating circuit, and a discharge circuit for each of said capacitors, each of said gating circuits being conditioned by the absence of an input pulse from its related input pulse source to effect the charging of the associated capacitor in circuit therewith through the base emitter circuit of said transistor whereby said transistor turned on and an output is produced during the absence of at least one of said input pulses.

5. A pulse generating circuit comprising an inverting amplifier transistor having an emitter, base and collector electrodes, means biasing the transistor to one state of operation, an input circuit including a diode connected to the base electrode of said transistor and adapted to receive discrete information pulses, a capacitor adapted to receive sync pulses overlapping the leading edges of the information pulses and having a terminal connected to the base electrode, the diode being effective to clamp the capacitor terminal at the potential of the information pulse at the termination of each sync pulse when an information pulse is applied to the input circuit to maintain the transistor in said one state, and a circuit including the base and emitter electrodes being effective at the termination of each sync pulse in the absence of an information pulse to set the transistor to another state of operation, the capacitor being effective upon the initiation of each sync pulse to reset the transistor to the one state of operation.

6. A pulse generating circuit comprising an inverting amplifier transistor having emitter, base and collector electrodes, a first input diode circuit connected to the base electrode and adapted to receive discrete input information pulses from a first source, a second input diode circuit connected to the base electrode and adapted to receive discrete input information pulses from a second source, a first capacitor connected to the first diode circuit and adapted to receive sync pulses overlapping the leading edges of the information pulses, a second capacitor connected to the second diode circuit and adapted to receive the sync pulses, and a circuit including the base and emitter electrodes effective only upon the absence of an input pulse from at least one of the sources at the termination of a sync pulse to turn on the transistor to produce an output pulse.

References Cited in the file of this patent

UNITED STATES PATENTS

| | | |
|---|---|---|
| 2,455,616 | Shepard | Dec. 7, 1948 |
| 2,831,971 | Wischmeyer | Apr. 22, 1958 |
| 2,891,172 | Bruce | June 16, 1959 |
| 2,918,587 | Rector et al. | Dec. 22, 1959 |
| 3,019,350 | Gauthey | Jan. 30, 1962 |
| 3,042,811 | Clapper | July 3, 1962 |
| 3,049,629 | Reach | Aug. 14, 1962 |

OTHER REFERENCES

"A Digital to Analogue Shaft Converter," by Margulius et al., June 1957.

"Simplified Coincidence Circuits Using Transistors and Diodes," By Miller, in The Review of Scientific Instruments, vol. 3, No. 6, pp. 395–398, June 1959.